2,751,322
Patented June 19, 1956

2,751,322

ADHESIVE COMPOSITION, METHOD OF BONDING WITH SAME, AND BONDED ARTICLE

Howard W. Bost, Robstown, Tex., assignor to Phillips Petroleum Company, a corporation of Delaware No Drawing. Application July 18, 1952,
Serial No. 299,756

17 Claims. (Cl. 154—130)

This invention relates to the preparation of compositions of matter possessing adhesive properties, and to means for bonding surfaces through the medium of said adhesive compositions. In still another aspect the invention relates to the convenient preparation of elastomer adhesives which are waterproof, self-bonding and thermosetting.

It is known that synthetic rubbers can be used as adhesives for bonding rubber sheet to themselves and for incorporation in pressure-sensitive tapes and household cements. It is also known that the formulation of elastomer adhesives, is for the most part complex, requiring the addition of accelerators, anti-oxidants, vulcanizing agents, tackifiers, plasticizers and other compounds known to those skilled in the art. In addition modification may be necessary depending on the desired use of the adhesive.

It is an object of the invention to produce an elastomer adhesive which requires little or no formulation. Another object of this invention is to provide means for bonding wood, metal, rubber, glass, fiber, paper and other materials. Other objects and advantages will become apparent from the following disclosure and examples.

In accordance with an embodiment of the instant invention a composition of matter possessing adhesive properties is provided by incorporating in an organic dispersing medium an amount sufficient to confer adhesive properties on the composition of a hydroxylated butadiene-derived rubber polymer having an oxygen content in the range of from 1 per cent to 20 per cent by weight. By butadiene-derived rubber polymer I mean polymers and copolymers of butadiene or polymerizable hydrocarbons containing the basic butadiene structure. The most important member of this class is polybutadiene. However the class also includes synthetic rubbers prepared by copolymerizing butadienes (particularly 1,3-butadiene) with styrene, acrylonitrile etc., and homopolymers or copolymers of conjugated diolefins containing from four to six carbon atoms. Therefore homopolymers of butadiene or conjugated diolefins containing from four to six carbon atoms per molecule and copolymers of these conjugated diolefins with each other or with copolymerizable materials, for example styrene, methyl-substituted styrenes, acrylonitrile, methacrylonitrile, methyl methacrylate and the like can be hydroxylated and employed in accordance with this invention. Thus a process for bonding solid materials is provided wherein an adhesive composition is placed between the materials, said adhesive comprising an organic solvent having dispersed therein a hydroxylated butadiene-derived rubber polymer having an oxygen content in the range from 1 per cent to 20 per cent, the Mooney value (ML–4) of the synthetic rubber polymer prior to hydroxylation being in the range of 10 to 100. By this process laminated structures can be made.

The butadiene-derived rubber polymers can be prepared by any of the polymerization methods known to the art, either mass polymerization, e. g. with sodium or sodium hydride as a catalyst, or emulsion polymerization. In emulsion polymerization the invention is not limited to any particular initiator-activator system, but, for example, can be employed using polymeric material prepared in hydroperoxide-iron complex systems, hydroperoxide-polyamine systems and in diazothioether systems. The amounts of activator and catalyst ingredients will vary depending upon the type and amounts of monomers used, and other reaction variables. It is understood, since these are elastomer or rubber-derived adhesives, that a major amount of butadiene or the polymerizable hydrocarbon containing the basic butadiene structure will be used.

The hydroxylation of butadiene-derived rubber polymer can be carried out by reaction with hydrogen peroxide or a compound capable of yielding hydrogen peroxide in the presence of a catalyst, examples of such catalysts being formic acid and lower alkyl esters thereof. Various inert solvents are used to bring the reactants into intimate contact and effect efficient utilization of oxygen. Suitable solvents are chloroform, carbon tetrachloride, chlorobenzene, methylene chloride, ethylene chloride, and the like. The hydroxylation reaction can usually be carried out at a temperature in the range of 10° C. to 95° C. The time of reaction depends on such factors as temperature of reaction and degree of hydroxylation desired; however the usual reaction period is in the range of 1 to 60 hours. Hydrogen peroxide and catalyst are used in a mol ratio of catalyst to hydrogen peroxide in the range of 0.2:1 to 2:1. The butadiene-derived rubber polymer to be hydroxylated will ordinarily have a Mooney value (ML–4) in the range between 10 and 100 and preferably below 50. Hydroxylation is effected under conditions to give products having an oxygen content in the range between one and 20 per cent by weight, i. e. the mol ratio of $C_4$ units, contained in the butadiene-derived rubber polymer, to hydrogen peroxide is in the range of 10 to 1 to 0.1 to 1. The peroxide is preferably used in aqueous solution. When high Mooney rubbers are used, it is generally preferred to hydroxylate to a lesser degree than in cases where low Mooney rubbers are employed. A rubbery material becomes stiffer or harder upon hydroxylation. When the rubbery polymer has a Mooney value (ML–4) below 50, for example, in the range between 10 and 45, it is generally preferred that the hydroxylated material have an oxygen content in the range between 10 and 18 per cent by weight.

In accordance with this invention the hydroxylated butadiene-derived rubber polymers prepared as hereinbefore described are dissolved or dispersed in suitable organic solvents in an amount sufficient to produce adhesive compositions. Aromatic solvents or dispersing media such as benzene, toluene, and xylene, halogenated hydrocarbons such as chloroform, carbon tetrachloride, methylene chloride, and ethylene chloride, and oxygenated solvents such as acetone, methyl ethyl ketone, methyl isopropyl ketone, cyclohexanone, ethyl acetate, butyl acetate, butyl formate, and amyl acetate are representative of the types of materials which are applicable. Blends of these solvents or dispersing agents can be used if desired. These materials should have a fairly high volatility. The choice of solvent is governed, at least in part, by the proposed use of the adhesive composition. For example, oxygenated solvents are frequently preferred for wood adhesives. Normally at least one per cent by weight of the hydroxylated butadiene-derived rubber polymer will be sufficient to confer adhesive properties on the composition, and although the upper limit will be determined by economic considerations a preferred amount is from 1 to 20 per cent by weight of hydroxylated polymer.

In cases where the solvent in the final adhesive composition is the same as that employed in the hydroxylation reaction, production of the adhesive composition is readily effected by adjusting the quantity of solvent to give the desired hydroxylated polymer to solvent ratio. There is generally an excess of solvent present from the hydroxylation reaction and it can be removed by any suitable means such as by evaporation, fractionation, or the like. If a higher boiling solvent is desired in the final product than was used in the hydroxylation reaction, it can be added first and the lower boiling material removed by fractionation. If the solvent to be employed in the final product is different from that used in the hydroxylation reaction, an alternative procedure is to remove the solvent from the hydroxylation reaction first and then treat the hydroxylated polymer with the solvent desired.

The dispersing medium or solvent in the adhesive composition is used in sufficient quantity to give a product of suitable viscosity for application such as for spreading, spraying, or the like. The ratio of the quantity of hydroxylated polymer to solvent will vary depending upon the Mooney value of the polymer from which the hydroxylated polymer was prepared and the ultimate use of the adhesive composition. In some instances it is desirable to have water present as a dispersing medium in addition to the organic solvent. In such cases the organic solvent employed is generally sparingly soluble or substantially insoluble in water. When water is used as an additional dispersion medium, suitable stabilizers for the dispersions are employed. In instances where the solution is dispersed in water the concentration of the solution of hydroxylated polymer in organic solvent is in the range between 5 and 20 per cent by weight.

The following examples illustrate the preparation of the novel adhesive compositions of this invention and their utility.

Example 1

Forty-five grams of 22 Mooney (ML-4) polybutadiene prepared by emulsion polymerization at 30° C. was charged to a reactor together with 720 grams of chloroform. The mixture was stirred over night (approximately 16 hours) and a fairly homogeneous material was obtained. The reactor was then charged with a 20 weight per cent aqueous solution of hydrogen peroxide (19.4 grams of 32.3 weight per cent hydrogen peroxide in sufficient water to make a 20 per cent solution) and 8.6 grams of anhydrous formic acid. The ratio of the above reactants was 4.6 $C_4$ equivalents of the polymer per mol of anhydrous hydrogen peroxide per mol of formic acid. After the addition of hydrogen peroxide and formic acid the reaction mixture was heated to 50° C. and maintained at that temperature for 8.5 hours. A large excess of water was then added and the mixture stirred and then allowed to stand over night. The chloroform-hydroxylated polybutadiene layer was separated and a large part of the chloroform was removed to give an adhesive composition of suitable viscosity for spreading. The hydroxylated polybutadiene had an oxygen content of approximately 12 per cent.

Example 2

An adhesive composition prepared in accordance with Example 1 was employed for forming a bond between two white pine panels. After applying the composition, the panels were pressed together with a C-clamp, placed in an oven at approximately 130° C., and left over night. The panels were removed from the oven, allowed to cool, and an attempt was made to separate them. The wood broke parallel to the adhesive bond.

Example 3

Tests were made as in Example 2 with an adhesive composition prepared according to Example 1 to bond rubber to rubber, glass to glass and metal to metal. It was found that firm bonds were formed in all cases.

Thus, in accordance with this invention, excellent adhesive compositions can be prepared from hydroxylated butadiene-derived rubber polymers. These elastomer adhesives are particularly useful because no further formulation is necessary in adhesives for bonding wood, metals and glass. As hereinbefore mentioned, the adhesive compositions of this invention are self-bonding, waterproof, and thermosetting. Bonding of two surfaces can be effected by pressure alone but it is frequently preferred to use an elevated temperature to give increased bond strength. Generally temperatures up to 450° F. are considered applicable. The temperature employed is dependent upon the bond being made and the adhesive composition employed. Higher temperatures are usually employed when the adhesive compositions are made from rubbers of fairly high Mooney value.

It is understood that the foregoing disclosure and examples are intended to be illustrative of the invention only, and other embodiments can be made without departing from the scope thereof. Thus, laminated articles can be made from many materials, paper, plastics, fibers, cloths, china, rock, linoleum etc.

This application is related to Serial No. 204,062, filed January 2, 1951, same assignee, now Patent Number 2,692,892.

I claim:

1. A process for bonding solid materials which comprises placing between the materials a layer of adhesive composition comprising an organic rubber solvent having dispersed therein, in an amount sufficient to confer adhesive properties on the composition, a hydroxylated butadiene-derived rubbery polymer having an oxygen content in the range from 1 per cent to 20 per cent by weight, the Mooney value (ML-4) of the synethetic rubber polymer prior to hydroxylation being in the range of 10 to 100.

2. A process for bonding solid materials, at least one of which is glass which comprises placing between the materials a layer of adhesive composition comprising an organic rubber solvent having dispersed therein, in an amount sufficient to confer adhesive properties on the dispersion medium, a hydroxylated polybutadiene having an oxygen content in the range from 10 per cent to 18 per cent by weight, the Mooney value (ML-4) of polybutadiene prior to hydroxylation being in the range of 10 to 45, said bonding being effected by pressure.

3. A process for bonding solid materials, at least one of which is metal which comprises placing between the materials a layer of adhesive composition comprising benzene having dissolved therein, in an amount sufficient to confer adhesive properties on the composition, a hydroxylated polybutadiene having an oxygen content of 12 per cent by weight, the Mooney value (ML-4) of polybutadiene prior to hydroxylation being 22, said bonding being effected by pressure and at an elevated temperature.

4. A process for bonding rubber to metal which comprises placing between the materials a layer of adhesive composition comprising an organic rubber solvent having dispersed therein, in an amount sufficient to confer adhesive properties on the composition, a hydroxylated butadiene-styrene rubber copolymer having an oxygen content in the range of 1 per cent to 20 per cent, by weight, the Mooney value (ML-4) of copolymer prior to hydroxylation being in the range of 10 to 50, said bonding being effected by pressure, and at an elevated temperature.

5. A new article of manufacture comprising a laminated structure including at least three layers, two layers being solid materials, and the third layer being an intermediate layer comprising a hydroxylated butadiene-derived synthetic rubber polymer having an oxygen content in the range from 1 per cent to 20 per cent by weight, the Mooney value (ML-4) of the synthetic rubber polymer prior to hydroxylation being in the range of 10 to 100, said article being substantially integral whereby the two outer layers are bonded together through said intermediate layer.

6. A new article of manufacture comprising a laminated structure including at least three layers, two layers being metals and the third layer being an intermediate layer comprising a hydroxylated polybutadiene having an oxygen content in the range from 10 per cent to 18 per cent by weight, the Mooney value (ML-4) of polybutadiene prior to hydroxylation being in the range of 10 to 45, said article being substantially integral whereby the two outer layers are bonded together through said intermediate layer.

7. A new article of manufacture comprising a laminated structure including at least three layers, two layers being rubber and metal, and the third layer being an intermediate layer comprising a hydroxylated polybutadiene having an oxygen content of 12 per cent by weight, the Mooney value (ML-4) of polybutadiene prior to hydroxylation being 22, said article being substantially integral whereby the two outer layers are bonded together through said intermediate layer.

8. A new article of manufacture comprising a laminated structure including at least three layers, two layers being solid materials, and the third layer being an intermediate layer comprising an organic rubber solvent having dispersed therein, in an amount sufficient to confer adhesive properties on the dispersion medium, a hydroxylated butadiene-derived synthetic rubber polymer having an oxygen content in the range from 1 per cent to 20 per cent by weight, the Mooney value (ML-4) of the synthetic rubber polymer prior to hydroxylation being in the range of 10 to 100, said article being substantially integral whereby the two outer layers are bonded together through said intermediate layer.

9. A new article of manufacture comprising a laminated structure including at least three layers, two layers being metals and the third layer being an intermediate layer comprising an organic rubber solvent having dispersed therein, in an amount sufficient to confer adhesive properties on the dispersion medium, a hydroxylated polybutadiene having an oxygen content in the range from 10 per cent to 18 per cent by weight, the Mooney value (ML-4) of polybutadiene prior to hydroxylation being in the range of 10 to 45, said article being substantially integral whereby the two outer layers are bonded together through said intermediate layer.

10. A new article of manufacture comprising a laminated structure including at least three layers, two layers being rubber and metal, and the third layer being an intermediate layer comprising benzene having dissolved therein, in an amount sufficient to confer adhesive properties on the benzene, a hydroxylated polybutadiene having an oxygen content of 12 per cent by weight, the Mooney value (ML-4) of polybutadiene prior to hydroxylation being 22, said article being substantially integral whereby the two outer layers are bonded together through said intermediate layer.

11. A process for bonding solid materials, at least one of which is wood, which comprises placing between the member to be bonded a layer of an adhesive composition comprising an organic solvent having dispersed therein, in an amount sufficient to confer adhesive properties on the composition, a hydroxylated polybutadiene having an oxygen content of between 1 and 20 per cent by weight, the Mooney value (ML-4) of polybutadiene prior to hydroxylation being in the range of 10 to 100, and applying pressure and an elevated temperature to effect the bond.

12. A new article of manufacture comprising a laminated structure including at least three layers, two layers being wood and the third layer being an intermediate bonding composition layer comprising a hydroxylated polybutadiene having an oxygen content of between 1 and 20 per cent by weight, the Mooney value (ML-4) of polybutadiene prior to hydroxylation being in the range of 10 to 100.

13. The article of claim 12 wherein the hydroxylated polybutadiene is dispersed in an oxygenated organic solvent.

14. The article of claim 12 wherein the hydroxylated polybutadiene has an oxygen content of 10 to 18 per cent by weight, the Mooney value (ML-4) of the polybutadiene prior to hydroxylation being in the range of 10 to 45.

15. The article of claim 14 wherein the hydroxylated polybutadiene is dispersed in an oxygenated organic solvent.

16. A composition of matter which comprises a hydroxylated butadiene-derived rubbery polymer produced by reacting a butadiene-derived rubbery polymer having a Mooney value of 10 to 100 with a reactant selected from the class consisting of hydrogen peroxide and compounds decomposable thereto in the presence of a catalyst selected from the group consisting of formic acid and lower alkyl esters thereof, at a temperature of 10 to 95° C. for a time of 1 to 60 hours, the resulting hydroxylated reaction product having an oxygen content of between 1 and 20 per cent by weight.

17. A composition of matter which comprises a hydroxylated butadiene-derived rubbery polymer produced by reacting a butadiene-derived rubbery polymer having a Mooney value of 10 to 45 with a reactant selected from the class consisting of hydrogen peroxide and compounds decomposable thereto in the presence of a catalyst selected from the group consisting of formic acid and lower alkyl esters thereof, at a temperature of 10 to 95° C. for a time of 1 to 60 hours, the resulting hydroxylated reaction product having an oxygen content of between 10 and 20 per cent by weight.

References Cited in the file of this patent

UNITED STATES PATENTS

| Number | Name | Date |
|---|---|---|
| 2,376,854 | Saunders et al. | May 22, 1945 |
| 2,443,678 | Garvey | June 22, 1948 |
| 2,469,847 | Rumscheidt et al. | May 10, 1949 |
| 2,471,905 | Smith | May 31, 1949 |
| 2,522,135 | Schaffer | Sept. 12, 1950 |
| 2,587,430 | Baldwin | Feb. 26, 1952 |
| 2,692,892 | Hillyer et al. | Oct. 26, 1954 |